UNITED STATES PATENT OFFICE.

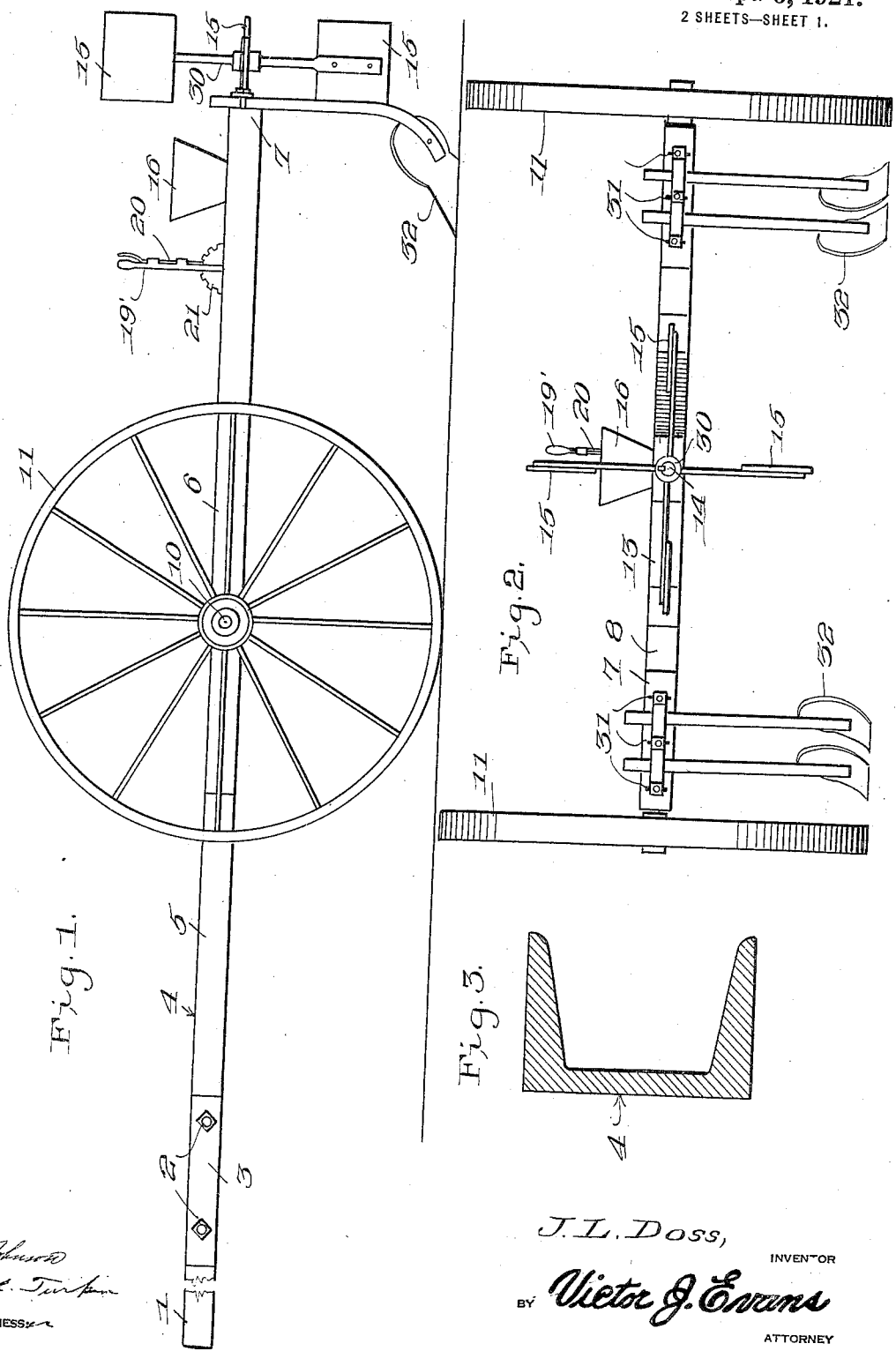

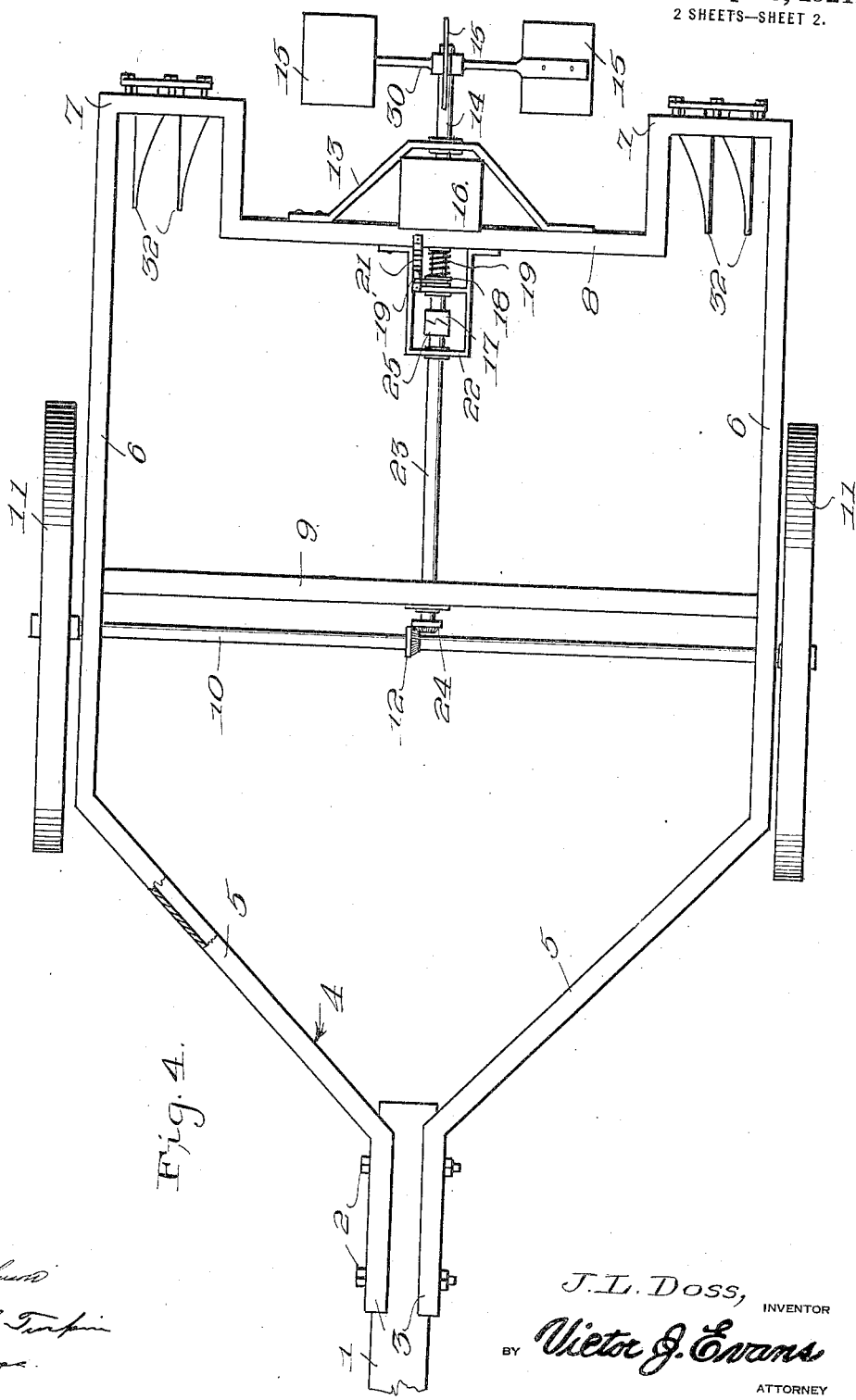

JOHN LESLIE DOSS, OF ALBANY, ALABAMA.

COTTON-CHOPPER.

1,390,100.  Specification of Letters Patent.  Patented Sept. 6, 1921.

Application filed December 13, 1920. Serial No. 430,297.

*To all whom it may concern:*

Be it known that I, JOHN L. DOSS, a citizen of the United States, residing at Albany, in the county of Morgan and State of Alabama, have invented new and useful Improvements in Cotton-Choppers, of which the following is a specification.

My present invention has for its object the provision of a simple, inexpensive, light and strong wheeled apparatus, adapted to be used to advantage as a cotton chopper, seed planter or ground working apparatus.

To the attainment of the foregoing the invention consists in the improvement as hereinafter described and definitely claimed.

In the accompanying drawings, hereby made a part hereof:—

Figure 1 is a side elevation of my novel apparatus complete.

Fig. 2 is a rear end elevation of the same.

Fig. 3 is a transverse section of one of the frame bars on an enlarged scale.

Fig. 4 is a plan view of the apparatus complete.

Similar numerals of reference designate corresponding parts in all of the views of the drawings.

Among other elements my novel apparatus comprises a wooden tongue 1, the rear portion of which is interposed between and bolted at 2 to the forward parallel portions 3 of a frame bar 4, the said frame bar 4 providing the frame of the apparatus and including in addition to the forward parallel terminal portions 3 the following portions, viz., rearwardly divergent portions 5 immediately in rear of the portions 3, side portions 6, loops 7 within and at the rear ends of the side portions 6, and a transverse portion 8 interposed between and joining the forward inner ends of the loops 7. The said frame bar 4 is combined with a transverse bar 9 that is fixed at its ends to the side portions 6. By comparison of Figs. 1 and 4 it will be noticed that the channel of the bar 4 is arranged inwardly so that of themselves the parallel portions 3 are adapted to prevent vertical swinging movement of the tongue 1. In addition to the tongue and frame constructed in the manner described my novel apparatus comprises a transverse shaft 10 journaled in the side portions 6 of the frame, ground wheels 11 fixed on said shaft and arranged exteriorly of the frame, and a miter gear 12 fixed on the shaft 10 at the center thereof. Journaled in the portion 8 of the frame bar 4 and in a bracket 13 at the rear side of said portion 8 is a longitudinal shaft 14 on the rear portion of which are carried cotton chopping knives 15. Superimposed on the bar portion 8 and the bracket 13 and having its working parts connected with the shaft 14 is a seed hopper 16. At its forward end the shaft 14 is provided with a clutch member 12, and in rear of said clutch member the shaft is provided with a collar 18 between which and the bar portion 8 is interposed a spring 19 that tends to press the shaft 14 forwardly. The collar 18 serves for the connection of a clutch lever 19 associated with which is a detent 20 and a segmental rack 21. A bracket 22 is carried at the forward side of the bar portion 8, and in the said bracket 22 and the cross bar 9 is journaled a longitudinal drive shaft 23 that carries a miter gear 24 and a clutch member 25. The miter gear 24 is intermeshed with the miter gear 12, and the clutch member 25 is for the engagement of the complementary clutch member 17 on the shaft 14. Manifestly when the members 17 and 25 are in engagement, and the shafts 23 and 14 will be rotated from the shaft 10. When, however, the shaft 14 is shifted rearwardly against the action of the spring 19 the shaft 14 will be rendered idle. At this point I would have it understood that I prefer to detachably key the body carrying the chopping knives 15 on the shaft 14, this in order that when the apparatus is to be used for planting purposes the knives 15 and the body 30 by which said knives are carried may if desired be expeditiously and easily removed from the shaft 14.

The loop portions 7 of the frame bar 4 are provided with slots 31 for the detachable connection of plows 32; the said plows being adapted to be used for ground working or cultivating purposes, and being adapted when the apparatus is used as a planter to give place to seed covering plows or devices.

It will be apparent from the foregoing that the general construction of my novel apparatus is light and strong and durable; and that the apparatus is adapted to be adjusted expeditiously and without the assistance of skilled labor when it is desired to put it to any of the uses for which it is fitted.

Having described my invention, what I claim and desire to secure by Letters-Patent, is:—

An agricultural apparatus comprising a tongue, a channel frame bar having its channel innermost and also having forward parallel terminal portions between which the tongue is received and secured, rearwardly divergent forward portions, side portions, inner loops at the rear ends of the side portions and a transverse portion interposed between and joining the inner ends of the loops; a transverse bar interposed between and fixed to the side portions of said frame bar, a shaft journaled in the side portions of said frame bar and having ground wheels exterior of the frame and also having a miter gear, a longitudinal shaft having a miter gear intermeshed with said miter gear of the transverse shaft and also having a clutch member, and an additional longitudinal shaft journaled in the said interposed rear portion of the frame bar and having a complementary clutch member, yielding means on the last-mentioned shaft to retain the clutch member thereon in engagement with the first-named clutch member, and means to adjust the third shaft rearwardly and adjustably fix the same.

In testimony whereof I affix my signature.

JOHN LESLIE DOSS.